(12) United States Patent
Takahashi

(10) Patent No.: US 8,857,819 B2
(45) Date of Patent: Oct. 14, 2014

(54) MECHANICAL SEAL

(75) Inventor: Hidekazu Takahashi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 14/113,075

(22) PCT Filed: Jul. 13, 2012

(86) PCT No.: PCT/JP2012/067883
§ 371 (c)(1),
(2), (4) Date: Oct. 21, 2013

(87) PCT Pub. No.: WO2013/038792
PCT Pub. Date: Mar. 21, 2013

(65) Prior Publication Data
US 2014/0035234 A1    Feb. 6, 2014

(30) Foreign Application Priority Data
Sep. 12, 2011    (JP) .................................. 2011-198204

(51) Int. Cl.
*F16J 15/38*    (2006.01)
*F16J 15/34*    (2006.01)

(52) U.S. Cl.
CPC .......... *F16J 15/3452* (2013.01); *F16J 15/3472* (2013.01)
USPC ............................ 277/390; 277/372; 277/373

(58) Field of Classification Search
USPC .................. 277/359, 370, 371, 372, 373, 390
See application file for complete search history.

(56) References Cited

U.S. PATENT DOCUMENTS

| | | | |
|---|---|---|---|
| 6,357,753 B1 | 3/2002 | Yamasaki et al. | |
| 6,708,980 B2 * | 3/2004 | Takahashi | 277/380 |
| 6,932,348 B2 * | 8/2005 | Takahashi | 277/359 |
| 7,878,509 B2 * | 2/2011 | Takahashi | 277/359 |
| 8,231,130 B2 * | 7/2012 | Takahashi | 277/375 |
| 2003/0042681 A1 * | 3/2003 | Takahashi | 277/349 |
| 2003/0042683 A1 * | 3/2003 | Takahashi | 277/370 |
| 2008/0093806 A1 | 4/2008 | Takahashi | |
| 2009/0085300 A1 * | 4/2009 | Takahashi | 277/391 |
| 2012/0001394 A1 * | 1/2012 | Suefuji | 277/369 |
| 2012/0139186 A1 * | 6/2012 | Suefuji | 277/377 |

FOREIGN PATENT DOCUMENTS

| | | |
|---|---|---|
| EP | 1895209 A1 | 3/2008 |
| JP | 2000-266190 A | 9/2000 |
| JP | 2000-356270 A | 12/2000 |
| JP | 2005-048818 A | 2/2005 |
| WO | WO-2006-022378 A1 | 3/2006 |
| WO | WO-2006-137305 A1 | 12/2006 |

OTHER PUBLICATIONS

International Search Report (in Japanese with English translation) for PCT/JP2012/067883, mailed Oct. 16, 2012; ISA/JP.

* cited by examiner

*Primary Examiner* — Gilbert Lee
(74) *Attorney, Agent, or Firm* — Harness, Dickey & Pierce, P.L.C.

(57) ABSTRACT

A cartridge-mechanical seal includes a first recess provided on an end face of a seal cover. A second recess is provided on an outer circumference of a collar. A set plate fixed to the end face of the seal cover. When the set plate is fixed, a projection is inserted in the first recess and in contact with the rotary shaft's side face of the first recess, and an end of the set plate is in contact with the bottom of the second recess, whereby positioning of the seal cover and the collar with respect to a radial direction is achieved.

1 Claim, 5 Drawing Sheets

MECHANICAL SEAL

CROSS-REFERENCE TO RELATED APPLICATIONS

This application is a National Stage of International Application No. PCT/JP2012/067883, filed Jul. 13, 2012, and published in Japanese as WO 2013/038792 A1 on Mar. 21, 2013. This application claims the benefit and priority of Japanese Application No. 2011-198204, filed Sep. 12, 2011. The entire disclosures of the above applications are incorporated herein by reference.

TECHNICAL FIELD

The present disclosure relates to a cartridge-mechanical seal.

BACKGROUND ART

In a mechanical seal that seals an annular gap between a rotary shaft and a housing, a sliding interface between a fixed ring provided on a seal cover side fixed to the housing and a rotary ring provided on a collar side fixed to the rotary shaft constitutes a sealing face. In this structure, a biasing member that biases the fixed ring against the rotary ring is provided to maintain the sliding contact between the fixed ring and the rotary ring. Alternatively, a biasing member that biases the rotary ring against the fixed ring is provided in some cases. Consequently, when the mechanical seal is mounted in a predetermined position, the mechanical seal is in a biased state in which a biasing force by the biasing member is acting. Therefore, in order for the mechanical seal to be mounted while being kept in position, some measure is needed. Conventionally, a structure including a sleeve attached to the rotary shaft is used, and a mark is drawn at a position on the surface of the sleeve at which the mechanical seal is to be mounted. However, in this case, the assembly process requires a lot of effort. For this reason, the use of a cartridge-mechanical seal equipped with a set plate that temporarily fixes a seal cover and a collar has been mainstream.

A cartridge-mechanical seal according to a prior art will be described here with reference to FIGS. 6 and 7. FIG. 6 is a front view of a mechanical seal according to a prior art, and FIG. 7 is a schematic cross sectional view showing the mechanical seal according to the prior art in the mounted state. In FIG. 6 a set plate is not illustrated. The cross sectional view of the mechanical seal in FIG. 7 is taken on line B-B in FIG. 6.

The mechanical seal 500 is provided to seal an annular gap between a rotary shaft 200 and a housing 300. The mechanical seal 500 includes an annular seal cover 510 fixed to the housing 300, a fixed ring 520 provided on the seal cover 510 side, an annular collar 530 fixed to the rotary shaft 200, and a rotary ring 540 provided on the collar 530 side. The fixed ring 520 and the rotary ring 540 are adapted to be in sliding contact with each other by their end faces. In order to maintain the sliding contact, a biasing member (spring) 560 that biases the fixed ring 520 against the rotary ring 540 is provided.

The mechanical seal 500 according to the prior art further has a set plate 550 used to temporarily fix the seal cover 510 and the collar 530. The set plate 550 is adapted to be fixed on the outer circumference side of the collar 530 by a bolt 555. Fixing the set plate 550 brings a hook-shaped engagement projection 511 provided on the seal cover 510 and a hook-shaped engagement projection 551 provided on the set plate 550 into engagement with each other, so that the seal cover 510 and the collar 530 are fixed while being positioned with respect to both the axial and radial directions. There are a plurality of such set plates 550 arranged at predetermined circumferential intervals.

With the above-described construction, the mechanical seal 500 can be handled as a single piece as a whole. Thus, in the process of attaching the mechanical seal 500, the mechanical seal 500 constructed as a cartridge is firstly set at a predetermined position. Then, the seal cover 510 is fixed to the housing 300, and the collar 530 is fixed to the rotary shaft 200. Thereafter, the bolts 555 are removed to detach all the set plates 550. As a consequence, the collar 530 and the rotary shaft 540 are made rotatable, while the seal cover 510 and the fixed ring 540 are left fixed on the housing 300.

In the above-described cartridge-mechanical seal 500 according to the prior art, the engagement projection 511 is provided on the seal cover 510, which is the largest part of the mechanical seal 500 and relatively expensive. The seal cover 510 is produced by cutting a cylindrical blank made of a stainless steel. In consequence, the complex shape of the engagement projection 511 requires time-consuming cutting in making the seal cover 510. Moreover, since the engagement projection 511 is a thin part projecting in the axial direction from the seal cover 510, which has a diameter larger than the other parts, the rigidity of the engagement projection 511 tends to be low, leading to breakage during machining in some cases. Moreover, variations in the axial distance among types of the fixed ring 520 and the rotary ring 540 require corresponding variations in the dimension of the engagement projection 511. This leads disadvantageously to low versatility. The above-described situations can lead to an increase in the cost also.

PRIOR ART DOCUMENT

Patent Document

Patent Document 1: International Patent Publication WO2006/022378

SUMMARY

An object of the present disclosure is to provide a cartridge-mechanical seal that can be manufactured by easy machining at reduced cost.

Advantageous Effect of the Present Disclosure

To achieve the above object, the present disclosure employs the following means.

A mechanical seal according to the present disclosure is a cartridge-mechanical seal for sealing an annular gap between a rotary shaft and a housing, comprising:

an annular seal cover to be fixed to said housing;
a fixed ring provided on said seal cover side;
an annular collar to be fixed to said rotary shaft;
a rotary ring provided on said collar side and having a sealing face that is in sliding contact with an end face of said fixed ring;
a biasing member that biases said fixed ring against the rotary ring;
a set plate that temporarily fixes said seal cover and said collar and is detached from said seal cover and said collar after said seal cover is fixed to said housing and said collar is fixed to said rotary shaft, wherein a first recess is provided on an end face of said seal cover that is on the opposite side of the side facing said housing, a second recess is provided on an outer circumference of said collar, said set plate is adapted to be fixed to said end face of said seal cover, and when said set plate is fixed, a projection provided on said set plate is inserted in the first recess and in contact with a side face of the first recess and an end of said set plate is in contact with the bottom of the second recess, whereby positioning of said seal cover and said collar with respect to a radial direction is achieved, and a face of said set plate that faces said seal cover is in contact with said end face of said seal cover and a side face of the second recess that is on the seal cover side, whereby positioning of said seal cover and said collar with respect to an axial direction is achieved.

According to the present disclosure, the first recess is provided on the end face of the seal cover that is on the opposite side of the side facing the housing for the purpose of positioning and fixing by the set plate. Moreover, the first recess has a side face with which the projection provided on the set plate is in contact. Thus, the seal cover, which is the largest part among the constituent parts of the mechanical seal and tends to be relatively expensive, can be produced by simplified machining, and cost reduction can be achieved. Moreover, a portion of the seal cover that tends to be less rigid can be eliminated. Furthermore, even if there are variations in the axial distance among types of the fixed ring and the rotary ring, such variations do not affect the positional relationship between the seal cover and the set plate. Therefore, these parts can be used with different types of fixed rings and rotary rings. Therefore, the mechanical seal is improved in versatility.

As described above, the present disclosure can make machining easy and reduce cost.

DETAILED DESCRIPTION

In the following, a mode for carrying out the present disclosure will be described in detail based on an illustrative embodiment with reference to drawings. It should be noted that the dimensions, materials, shapes, relative arrangement, and other features of the components that will be described in connection with the embodiments are not intended to limit the scope of the present invention only to them, unless particularly stated.

<Embodiment>

A cartridge-mechanical seal according to an embodiment of the present disclosure will be described with reference to FIGS. 1 to 5D.

<Overall Construction of Mechanical Seal>

Figure 1:
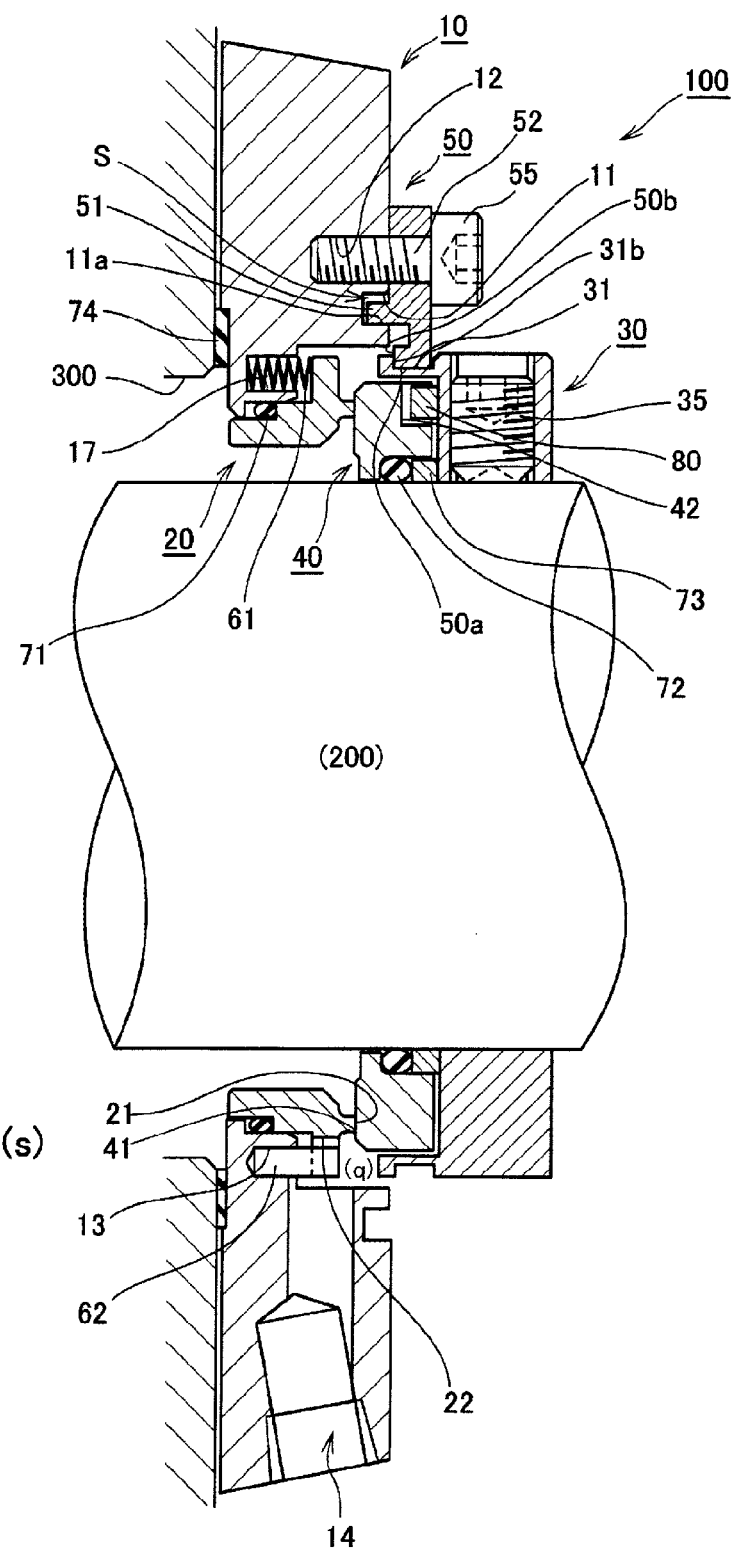
FIG. 1 is a schematic cross sectional view showing a mechanical seal according to an embodiment of the present disclosure in its mounted state.
Figure 2:
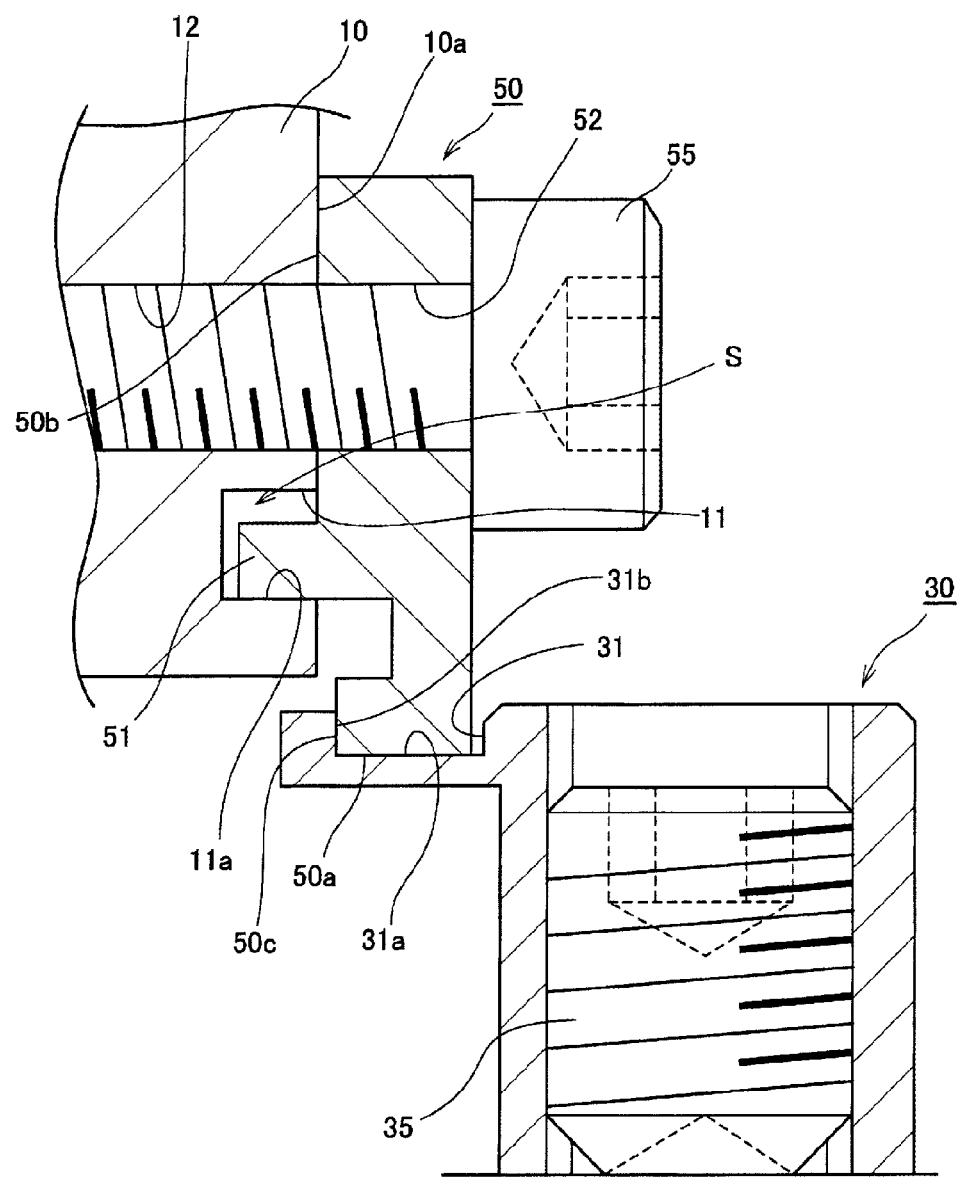
FIG. 2 is a cross sectional view showing a portion of FIG. 1 in an enlarged manner.
Figure 3:
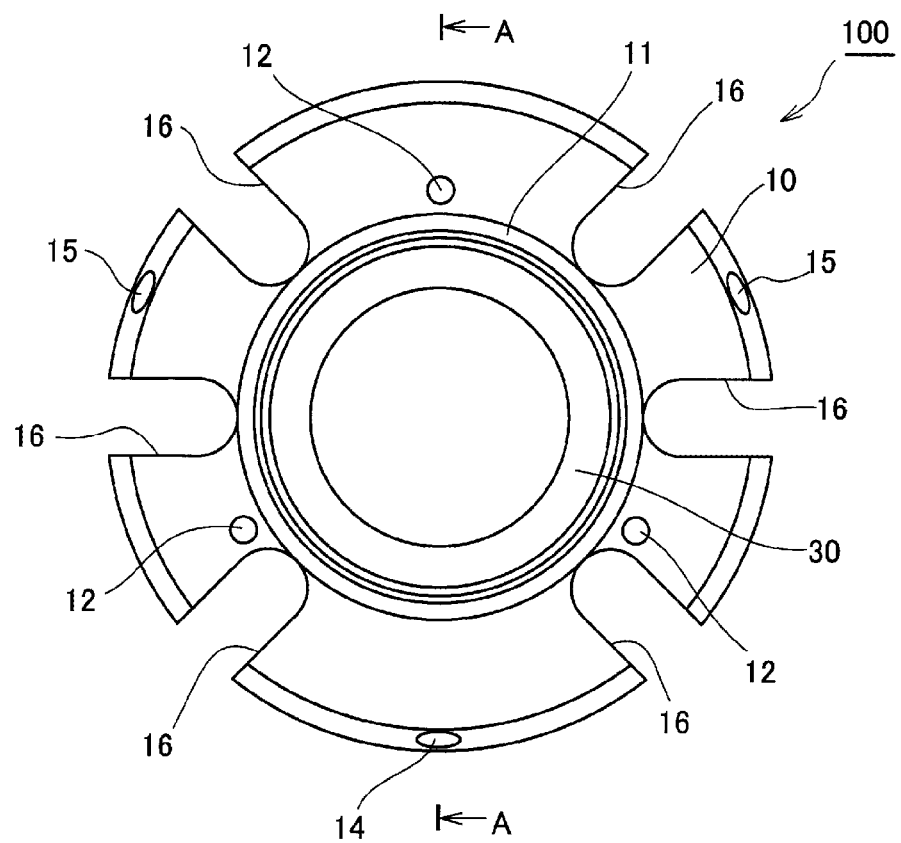
FIG. 3 is a front view of the mechanical seal according to the embodiment of the present disclosure.

The overall construction of a cartridge-mechanical seal according to the embodiment of the present disclosure will be described with reference to FIGS. 1 to 3. In FIG. 3, set plates are not illustrated. FIG. 1 is a cross sectional view of the mechanical seal taken on line A-A in FIG. 3. FIG. 2 is an enlarged view of portion of FIG. 1 showing a structure relevant to fixing of a seal cover and a collar by the set plate.

The mechanical seal 100 is provided to seal an annular gap between a rotary shaft 200 and a housing 300. Region (s) in FIG. 1 is a region in which sealed fluid is sealed, and region (q) in FIG. 1 is a region in which quenching fluid is sealed. The quenching fluid is supplied through an inlet port 15 and discharged through a discharge port 14 (see FIG. 3). The quenching fluid has the functions of forcibly discharging leaking sealed fluid, lubricating/cooling the sealing face, and isolating the sealing face from the atmosphere.

The mechanical seal 100 according to the embodiment includes an annular seal cover 10 fixed to the housing 300 and a fixed ring 20 provided on the seal cover 10 side. The seal cover 10 is made of, for example, a stainless steel. The seal cover 10 is fixed to the end face of the housing 300 with fixing parts such as bolts (not shown) inserted in a plurality of U-shaped grooves 16 (see FIG. 3). The seal cover 10 is manufactured by cutting a cylindrical blank. A gasket 74 made of a resin such as PTFE is provided between the end face of the housing 300 and the seal cover 10. Thus, the gap between the housing 300 and the seal cover 10 is sealed.

The fixed ring 20 is made of a ceramic material such as SiC or aluminum oxide. The rotational movement of the fixed ring 20 relative to the seal cover 10 is restricted, while its axial movement is allowed to some extent. Specifically, a knock pin 62 is inserted in a pin hole 13 provided on the seal cover 10. The knock pin 62 fits in a groove 22 provided on the fixed ring 20, thereby preventing the fixed ring 20 from rotating while allowing the fixed ring 20 to move in the axial direction, relative to the seal cover 10. In addition, a rubber O-ring 71 is provided between the inner circumferential surface of the seal cover 10 and the outer circumferential surface of the fixed ring 20, thereby sealing the annular gap between them. A spring 61 serving as a biasing member is set in a spring hole 17 provided on the seal cover 10.

The mechanical seal 100 further includes an annular collar 30 fixed to the rotary shaft 200 and a rotary ring 40 provided on the collar 30 side. The collar 30 is made of, for example, a stainless steel and adapted to be directly fixed to the rotary shaft 200 by a set screw 35. The rotary ring 40 is made of a ceramic material such as SiC or aluminum oxide. The rotational movement of the rotary ring 40 relative to the collar 30 is restricted, while its axial movement is allowed to some extent. Specifically, a knock pin 80 fixed to the collar 30 fits in a cut 42 formed on the rotary shaft 40, thereby preventing the rotary ring 40 from rotating while allowing the rotary ring 40 to move in the axial direction, relative to the collar 30. In consequence, as the rotary shaft 200 rotates, the rotary ring 40 rotates together with the collar 30. A rubber O-ring 72 and a seal ring 73 made of a stainless steel are provided between the inner circumferential surface of the rotary ring 40 and the outer circumferential surface of the rotary shaft 200, thereby sealing the annular gap between them.

As the rotary ring 40 rotates with the rotation of the rotary shaft 200, the end face of the fixed ring 20 and the end face of the rotary ring 40 are in sliding contact with each other. As described above, the fixed ring 20 is biased against the rotary ring 40 by the spring 61 serving as the biasing member. Thus, the sliding contact of the fixed ring 20 and the rotary ring 40 is maintained. Specifically, the fixed ring 20 has an annular projection projecting toward the rotary ring 40, and the top face 21 of the annular projection is adapted to be in sliding contact with the end face 41 of the rotary ring 40 that faces the fixed ring 20.

The mechanical seal 100 according to the embodiment is constructed as a cartridge before it is mounted at a predetermined position (namely attached to the rotary shaft 200 and the housing 300) so that it can be handled as a single piece. Specifically, the seal cover 10 and the collar 30 are temporarily fixed by a plurality of (three, in this embodiment) set plates 50. FIG. 1 shows a mechanical seal 100 as it is constructed as a cartridge. When the mechanical seal 100 is in use, all the set plates 50 are detached by removing the bolts 55. This makes the collar 30 and the rotary ring 40 rotatable with the rotary shaft 200 while leaving the seal cover 10 and the fixed ring 20 fixed to the housing 300.

<Temporary Fixing Structure>

Figure 4:
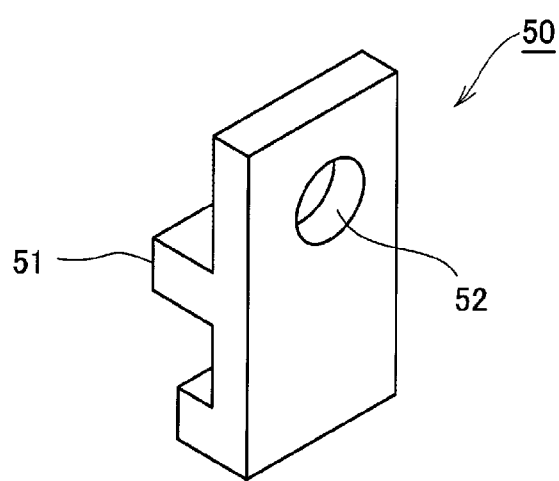
FIG. 4 is a perspective view of a set plate according to the embodiment of the present disclosure.

A temporary fixing structure using the set plates 50 in the mechanical seal 100 will be described with reference to FIGS. 1, 2, and 4. FIG. 4 is a perspective view of the set plate 50. The set plate 50 has a projecting part 51 projecting from a plate-like body part, and a through hole 52 provided in the plate-like body part, through which the shaft portion of the bolt 55 is to be inserted. The seal cover 10 and the collar 30 are temporarily fixed by the set plates 50 as such, so that the mechanical seal 100 is constructed as a cartridge that can be handled as a single piece.

In the following, the temporary fixing structure will be described in detail. The seal cover 10 has a first annular recess 11 provided on its end face 10a on the opposite side of the side facing the housing 300. The collar 30 has a second annular recess 31 provided on its outer circumference. The outer circumference of the collar 30 has an annular part projecting in the axial direction toward the fixed ring 20, and the second recess 31 is provided on this part.

The set plates 50 are fixed to the end face 10a side of the seal cover 10. Specifically, each set plate 50 is fixed by fastening the bolt 55 to a female screw 12 provided on the seal cover 10. When the set plate 50 is fixed, the projection 51 provided on the set plate 50 is inserted in the first recess 11. In this state, the projection 51 is in contact with the side face 11a of the first recess 11 that is on the rotary shaft 200 side, and an end (the lower end in FIGS. 1 and 2) 50a of the set plate 50 is in contact with the bottom 31a of the second recess 31. Thus, the positioning of the seal cover 10 and the collar 30 with respect to a radial direction is achieved. In this embodiment, there are three set plates 50 arranged at equal circumferential intervals, whereby centering of the seal cover 10 and the collar 30 is achieved. While in this illustrative embodiment the projection 51 is adapted to be in contact with the side face 11a of the first recess 11 that is on the rotary shaft 200 side, the projection 51 may be adapted to be in contact with the side face of the recess 11 that is on the opposite side of the side face 11a. In this case also, the positioning of the seal cover 10 and the collar 30 with respect to the radial direction can be achieved.

When the set plate 50 is fixed, moreover, the face of the set plate 50 that faces the seal cover 10 is in close contact with the end face 10a of the seal cover 10 by its portion 50b in the vicinity of the through hole 52, and its portion 50c near the aforementioned end 50a is in close contact with the side face 31b of the second recess 31 that is on the seal cover 10 side. Thus, the positioning of the seal cover 10 and the collar 30 with respect to the axial direction is achieved. In connection with this, a force directed away from the seal cover 10 is acting on the collar 30 by the biasing force of the spring 61 through the fixed ring 20 and the rotary ring 40. This keeps the aforementioned portion 50c of the set plate 50 and the side face 31b of the second recess 31 in close contact with each other.

The seal cover 10 (and the parts provided on the seal cover 10 side, such as the fixed ring 20) and the collar 30 (and the parts provided on the collar 30 side, such as the rotary ring 40) are temporarily fixed by the above-described arrangement while being positioned with respect to the radial and axial directions. As described above, the mechanical seal 100 is constructed as a cartridge, which can be handles as a single piece. When mounted, the mechanical seal 100 is firstly set at a predetermined position. Then, the seal cover 10 is fixed to the housing 300, and the collar 30 is fixed to the rotary shaft 200. Thereafter, all the set plates 50 are detached by removing the bolts 55.

<Set Plate>

The set plate 50 will be described more specifically with reference to FIGS. 4 to 5D. As described above, the portions of the set plate 50 that contribute to the positioning include the projection 51, the end 50a of the body part of the set plate 50, and the faces (50b and 50c) of the body part that face the seal cover 10. Therefore, these portions and the through hole 52 used to fix the set plate 50 to the seal cover 10 are essential portions. In other words, the set plate 50 may have various structures, as long as it is provided with these essential portions. It is desirable, however, that the set plate 50 be adapted to be easily detached from the seal cover 10 after removal of the bolt 55, because the set plate 50 needs to be removed when the mechanical seal 100 is used. A mode of the set plate 50 that is preferred in view of the above-described points will be described in the following.

Figure 5A:
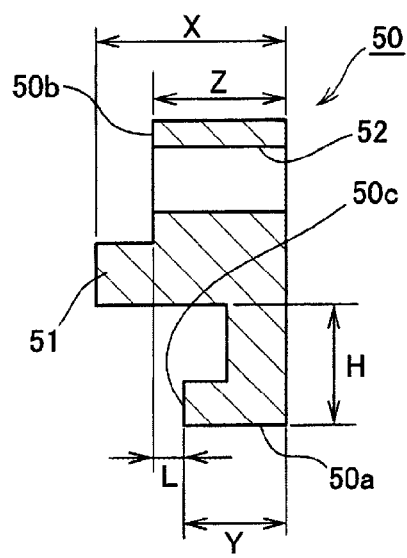
FIGS. 5A to 5D are cross sectional views of set plates according to embodiments of the present disclosure.

FIG. 5A is a cross sectional view of the set plate 50 shown in FIGS. 1, 2, and 4. If the conditions "X>Y" and "Z≥Y" in terms of the dimensions of the portions shown in FIG. 5A are satisfied, the set plate 50 can easily be attached and detached. The size relationship between dimensions "L" and "H" does not affect the ease of attachment/detachment much. It is preferred that a space S having an L-shaped cross section be formed between the projection 51 and the first recess 11 in the state in which the projection 51 is inserted in the first recess 11 (see FIG. 2).

Figure 5B:
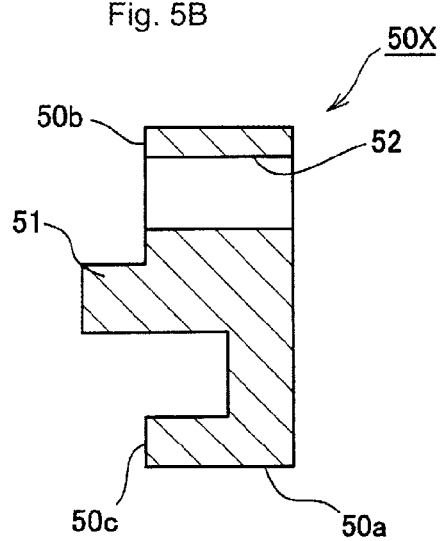
Figure 5C:
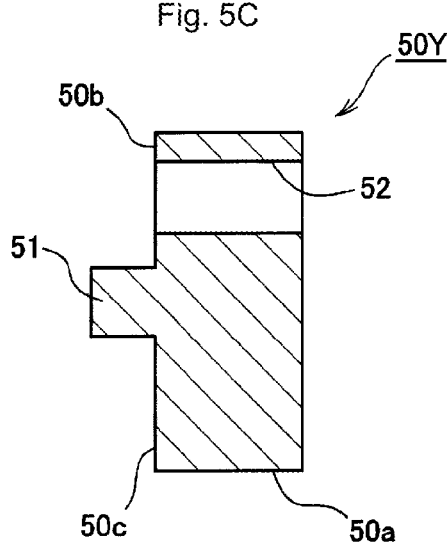
Figure 5D:
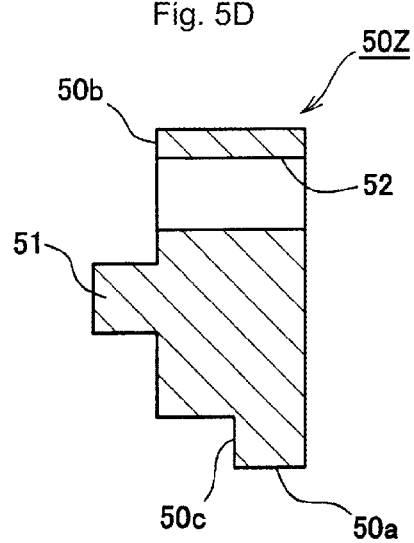
Figure 6:
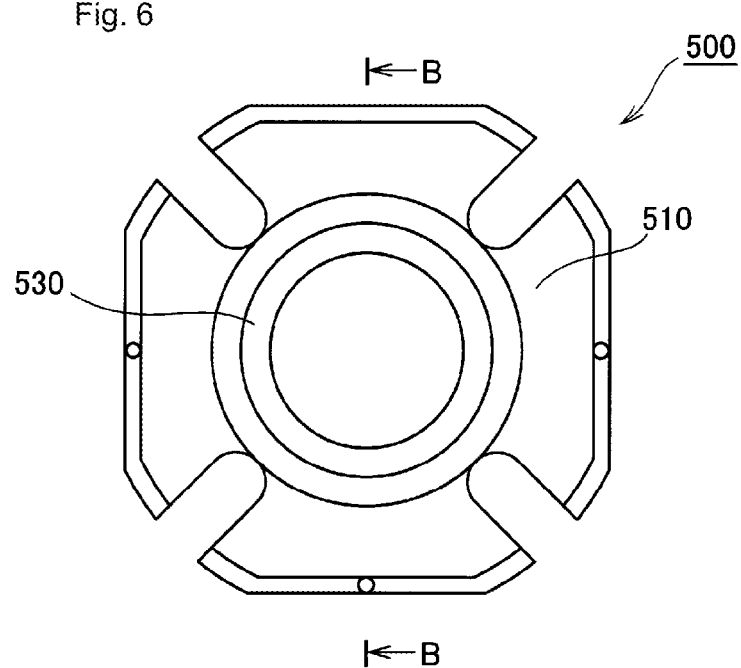
FIG. 6 is a front view of a mechanical seal according to a prior art.
Figure 7:
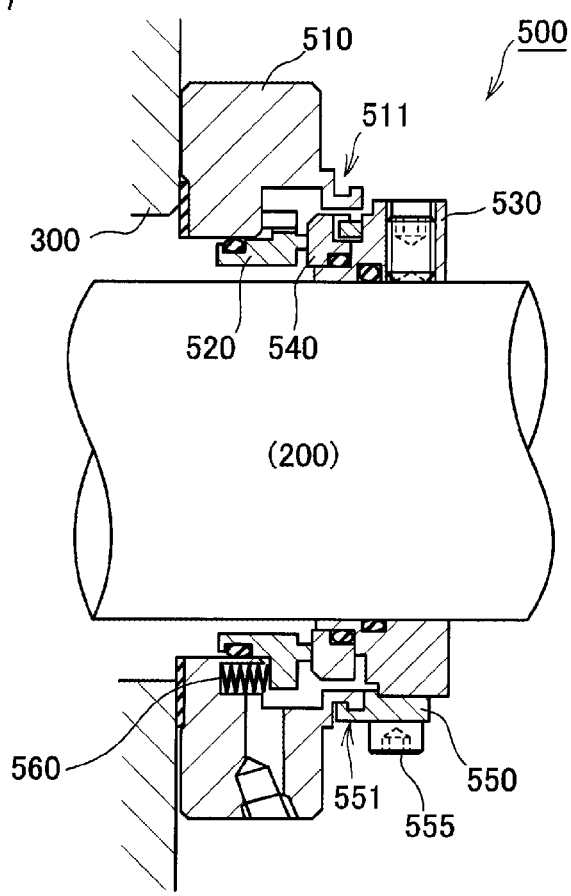
FIG. 7 is a schematic cross sectional view showing a mechanical seal according to the prior art in its mounted state.

The above-described structure allows easy attachment and detachment of the set plate 50. Thus, for example, a set plate having basically the same shape as the above-described set plate 50 and satisfying "X=Y" as shown in FIG. 5B as the set plate 50X may be used. Alternatively, a set plate having a simple structure such as a plate-like member provided with a projection 51 and a through hole 52 as shown in FIG. 5C as the set plate 50Y may be used. This set plate 50Y can be produced by simplest machining. The above-described set plate 50Y may be modified to have a step on the end 50a side. FIG. 5D shows such a set plate 50Z.

In the above-described embodiment, the set plate 550 used in the prior art is used as the set plate 50 without any modification. In other words, the set plate 50 can be used in both the mechanical seal 100 according to the embodiment and the mechanical seal 500 according to the prior art. It should be understood, however, that the portions playing a role in positioning with respect to the radial and axial directions are different between them. As described above, while the set plate 550 according to the prior art needs to have a hook-shaped engagement projection 551, the set plate according to the embodiment does not need to have such a complex portion. As described above, a set plate having a simple structure like the set plate 50Y shown in FIG. 5C may be used in the embodiment.

<Advantages of the Mechanical Seal According to the Embodiment>

In the mechanical seal 100 according to the embodiment, the first recess 11 is provided on the end face 10a of the seal cover 10 that is on the opposite side of the side facing the housing 300 for the purpose of positioning and fixing by the set plates 50 (50X, 50Y, 50Z). It is sufficient for the first recess 11 to have the side face 11a that is on the rotary shaft 200 side and with which the projection 51 provided on each set plate 50 is to be in contact. This means that the seal cover 10 does not need to have a complex structural part like the hook-shaped engagement projection needed in the prior art. Therefore, the seal cover 10, which is the largest part among the constituent parts of the mechanical seal 100 and tends to be relatively expensive, can be produced by simplified machining (cutting a cylindrical blank), and cost reduction can be achieved. Moreover, a portion of the seal cover 10 that tends to be less rigid can be eliminated. Furthermore, even if there are variations in the axial distance among types of the fixed ring 20 and the rotary ring 40, such variations do not affect the positional relationship between the seal cover 10 and the set plates 50. Therefore, these parts can be used with different types of fixed rings 20 and rotary rings 40. Therefore, the mechanical seal 100 according to the embodiment is improved in versatility.

In the case of the mechanical seal 100 according to the embodiment, it is necessary to provide an annular portion projecting in the axial direction toward the fixed ring 20, on the outer circumference of the collar 30, in order to form the second recess 31. If there are variations in the axial distance among types of the fixed ring 20 and the rotary ring 40, it is necessary to adjust the dimension of this annular portion. In consequence, the collar 30 in the mechanical seal 100 according to the embodiment is more complex than that of the prior art. However, the collar 30 is a smaller part as compared to the seal cover 10 and can be manufactured by easy machining. The axially-projecting annular portion is smaller in diameter than the hook-shaped engagement projection provided on the seal cover. Therefore, the rigidity of the annular portion is not so low. For the above reasons, a sufficient reduction in the cost can be achieved.

<Others>

In the embodiment, the first recess 11 provided on the seal cover 10 and the second recess 31 provided on the collar 30, which are to be positioned by the set plate 50, are both annular grooves. Grooves have an advantage over partially formed recesses in the ease of machining and in the ease of attachment/detachment of the set plates 50. However, because it is sufficient for the first recess 11 and the second recess 31 to have the function of positioning at least, they may be formed as not grooves but partially indented recesses.

DESCRIPTION OF THE REFERENCE NUMERALS

10: seal cover
11: first recess
12: female screw
13: pin hole
14: discharge port
15: inlet port
16: U-shaped groove
20: fixed ring
21: top face
22: groove
30: collar
31: second recess
35: set screw
40: rotary ring
50, 50X, 50Y, 50Z: set plate
51: projection
52: through hole
55: bolt
62: knock pin
71, 72: O-ring
73: seal ring
74: gasket
80: knock pin
100: mechanical seal
200: rotary shaft
300: housing

What is claimed is:

1. A cartridge-mechanical seal for sealing an annular gap between a rotary shaft and a housing, comprising:

an annular seal cover to be fixed to said housing;
a fixed ring provided on said seal cover side;
an annular collar to be fixed to said rotary shaft;
a rotary ring provided on said collar side and having a sliding face that is in sliding contact with an end face of said fixed ring;
a biasing member that biases said fixed ring against said rotary ring side;
a set plate that temporarily fixes said seal cover and said collar and is detached from said seal cover and said collar after said seal cover is fixed to said housing and said collar is fixed to said rotary shaft,
wherein an axially extending first recess is provided on a radially extending end face of said seal cover that is on the opposite side of the side facing said housing,
a second recess is provided on an outer circumference of said collar,
said set plate is adapted to be fixed to said end face of said seal cover, and
when said set plate is fixed, an axially extending projection provided on said set plate is inserted in the first recess and in contact with a side face of the first recess and an end of said set plate is in contact with the bottom of the second recess, whereby positioning of said seal cover and said collar with respect to a radial direction is achieved, and a face of said set plate that faces said seal cover is in contact with said end face of said seal cover and a side face of the second recess that is on the seal cover side, whereby positioning of said seal cover and said collar with respect to an axial direction is achieved.

* * * * *